March 6, 1962 A. F. MITTERMAIER 3,023,493
APPARATUS AND METHOD FOR ASSEMBLING
STACKED MAGNETIC CORES
Filed Nov. 25, 1958 8 Sheets-Sheet 1
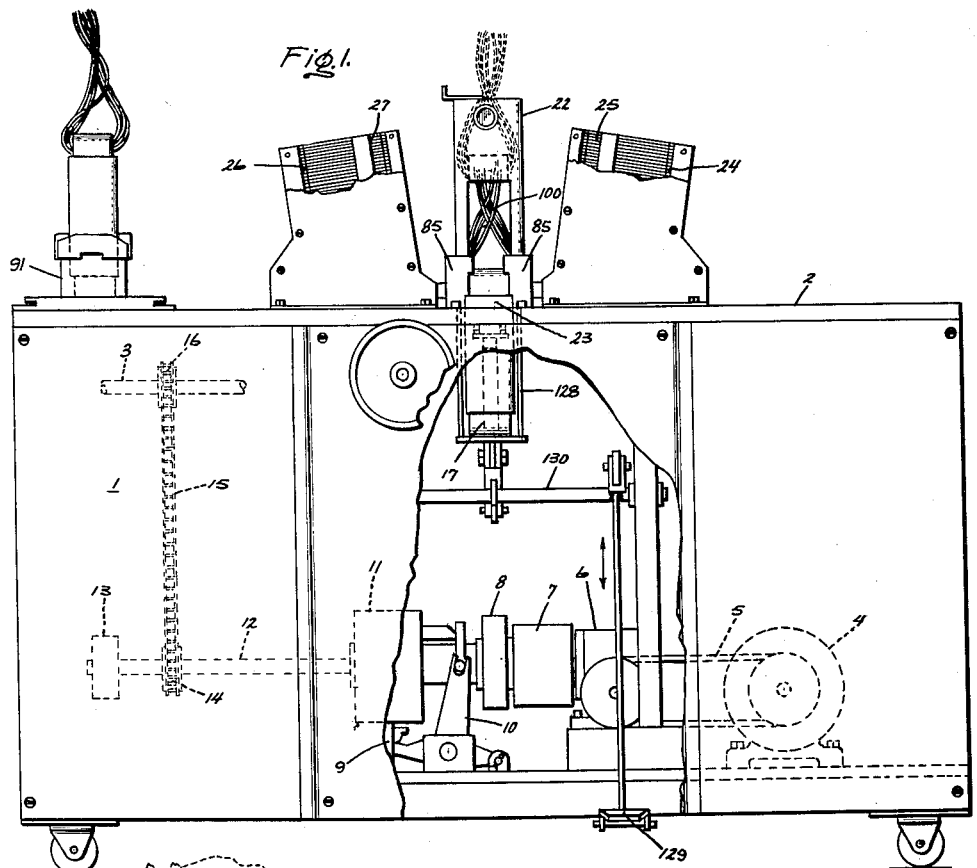
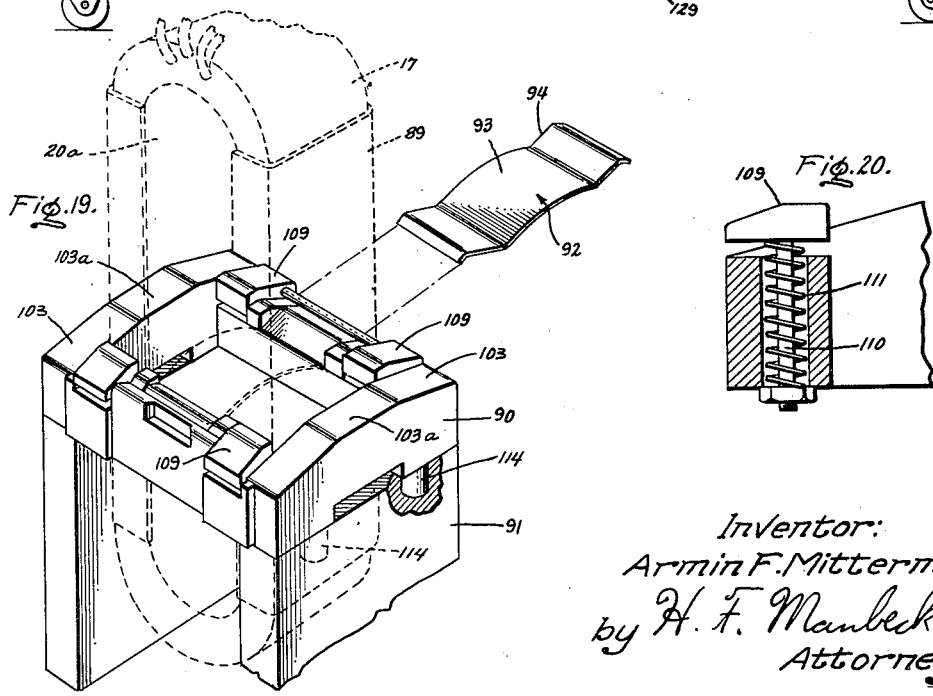
Inventor:
Armin F. Mittermaier,
by H. F. Manbeck, Jr.
Attorney.

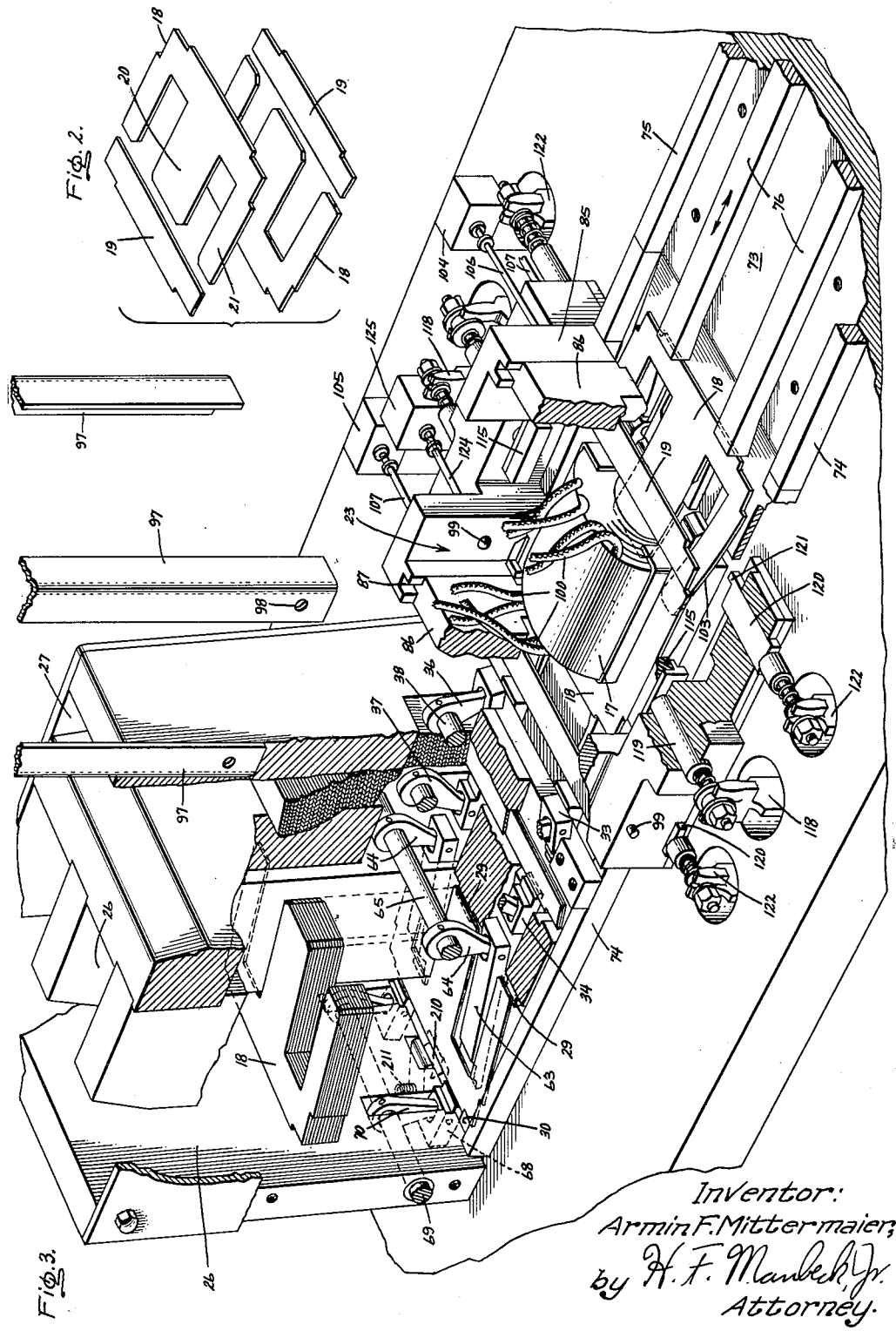

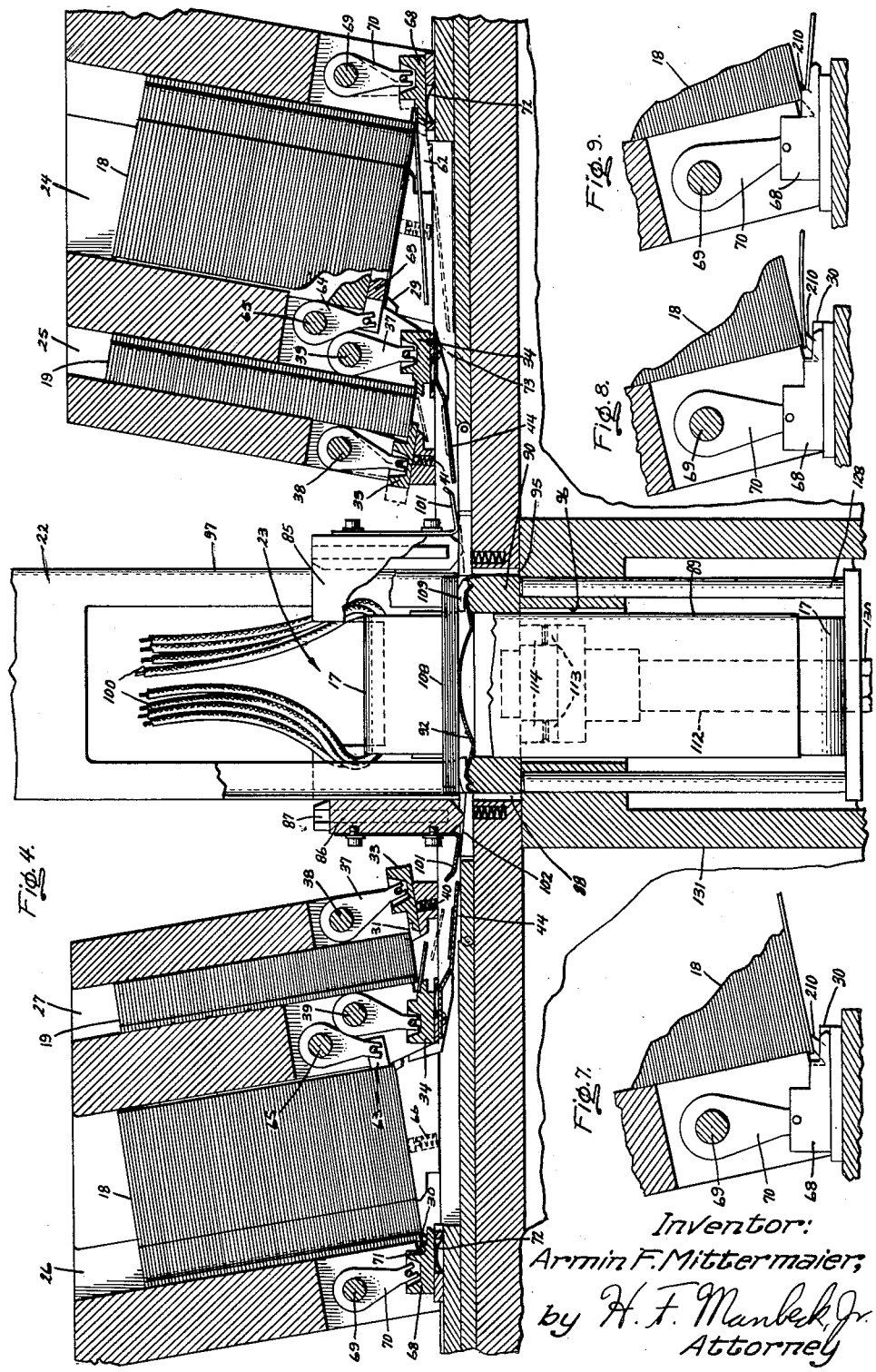

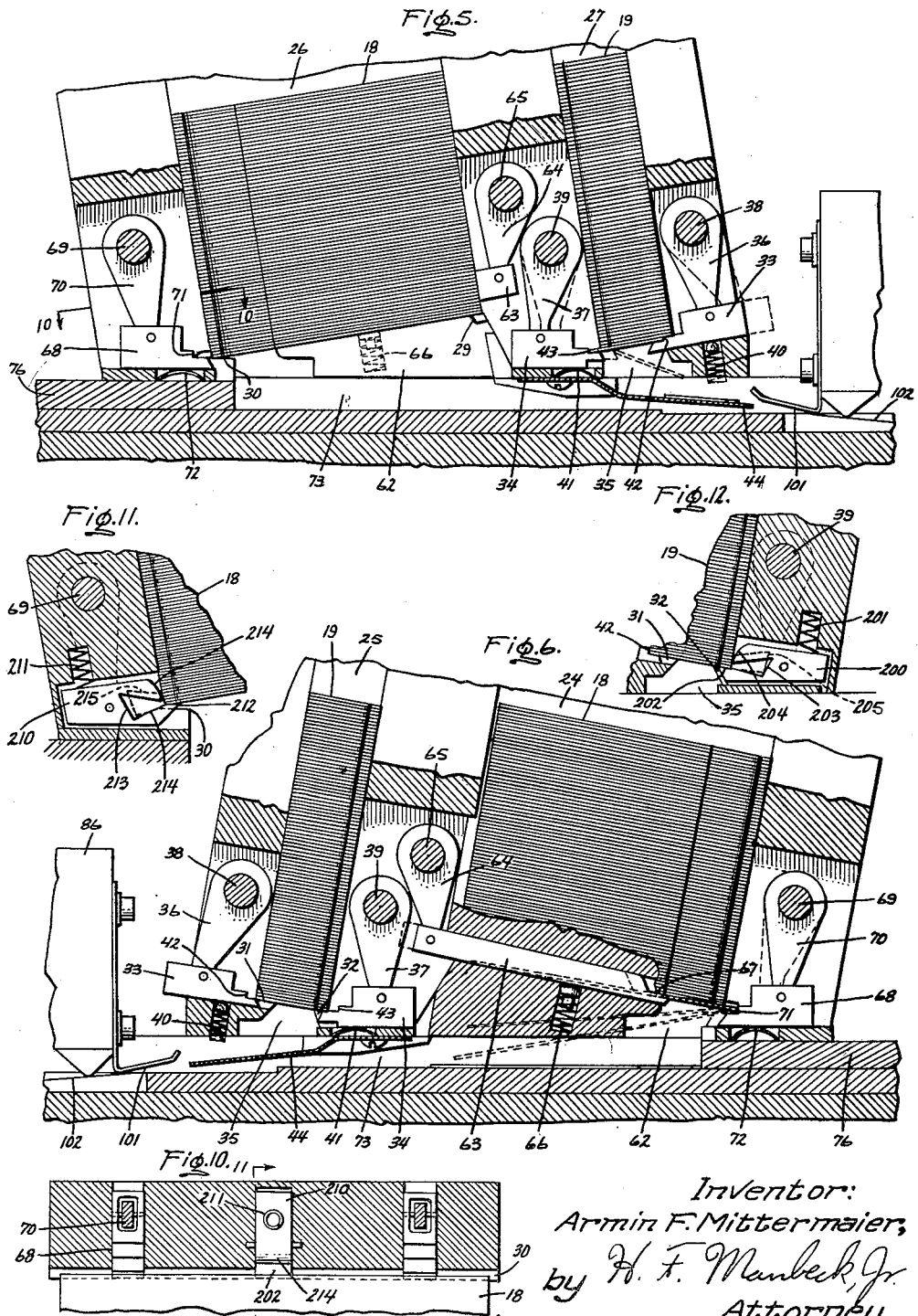

March 6, 1962
A. F. MITTERMAIER
3,023,493
APPARATUS AND METHOD FOR ASSEMBLING
STACKED MAGNETIC CORES
Filed Nov. 25, 1958
8 Sheets-Sheet 5
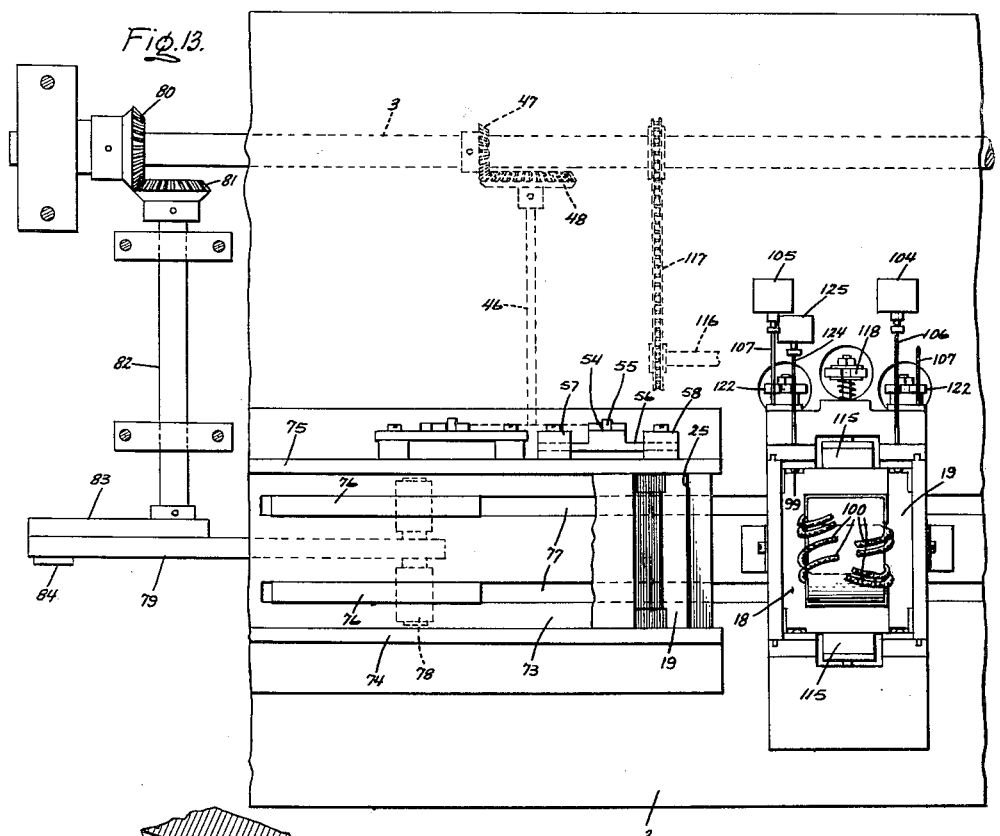
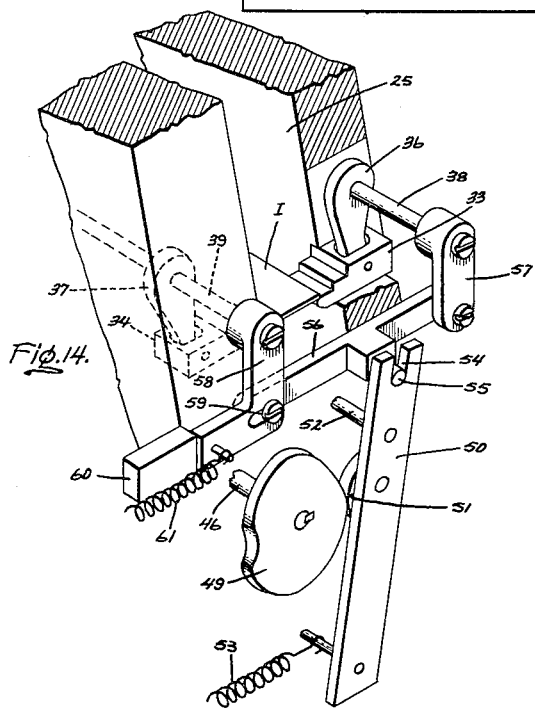
Inventor:
Armin F. Mittermaier,
by H. F. Manbeck, Jr.
Attorney.

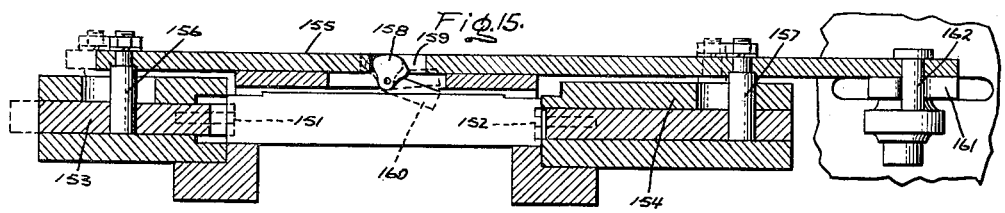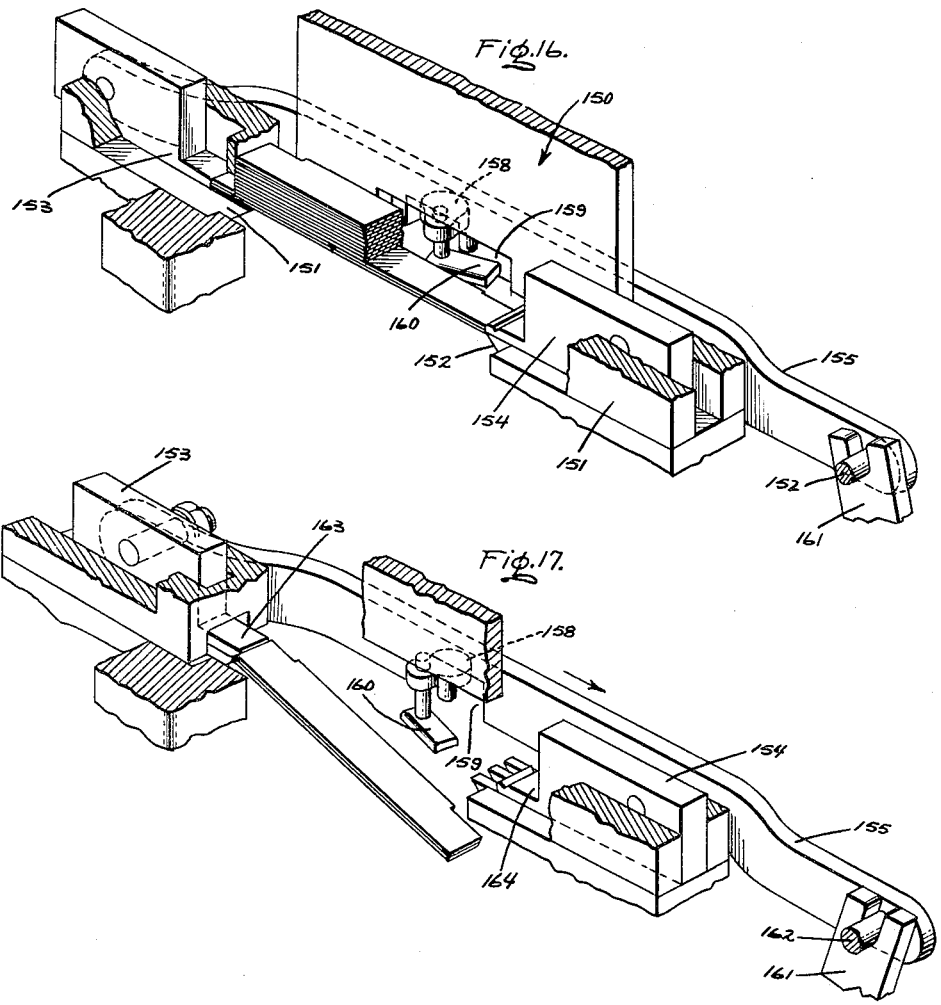

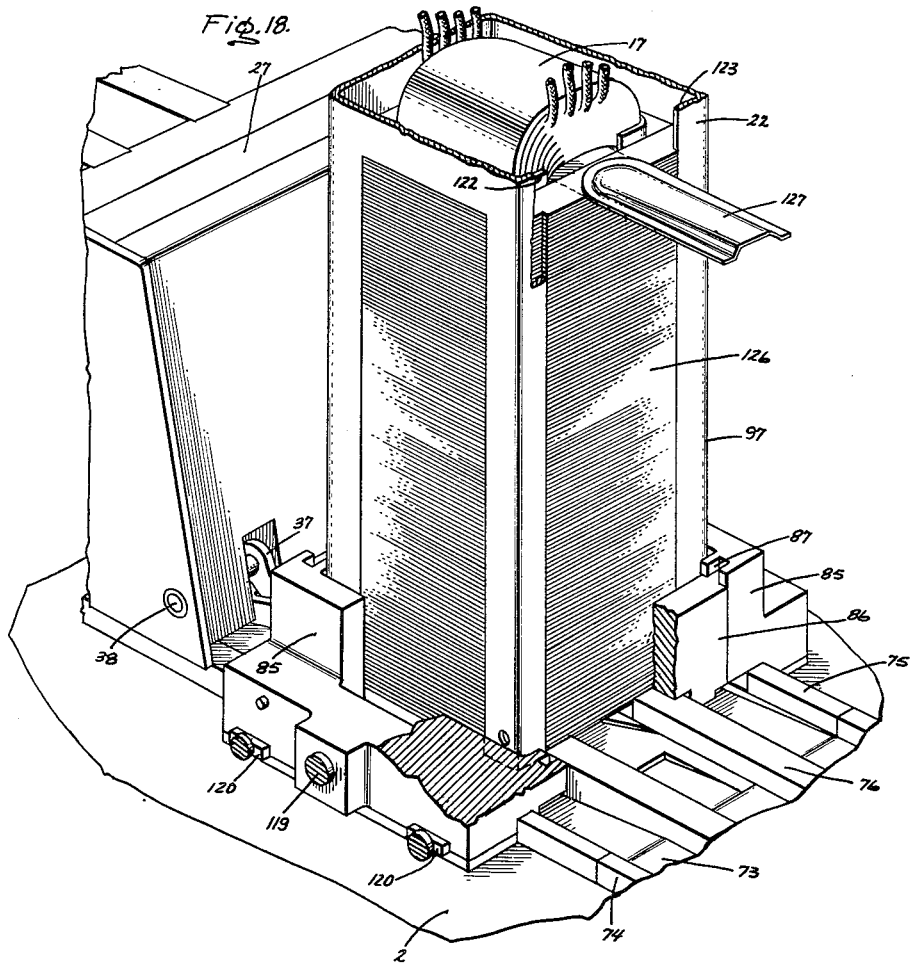
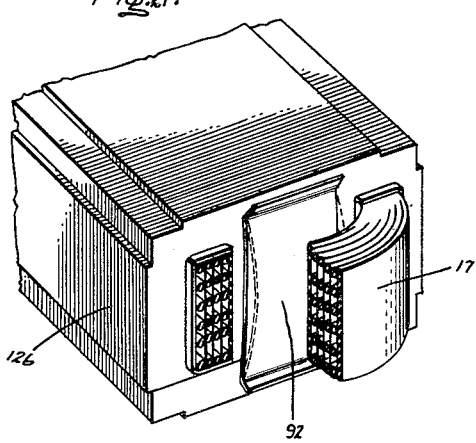

March 6, 1962  A. F. MITTERMAIER  3,023,493
APPARATUS AND METHOD FOR ASSEMBLING
STACKED MAGNETIC CORES
Filed Nov. 25, 1958  8 Sheets-Sheet 8
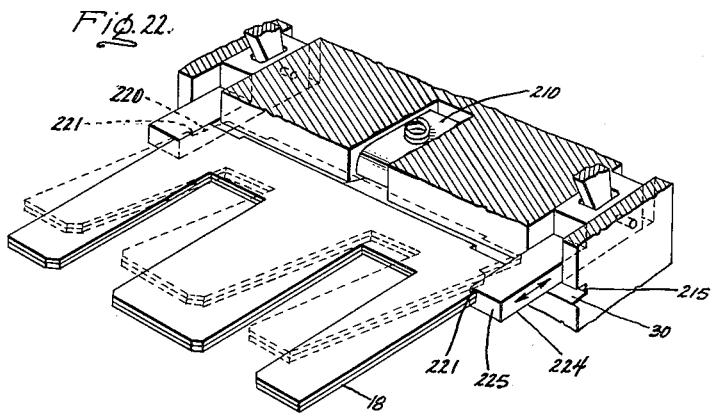
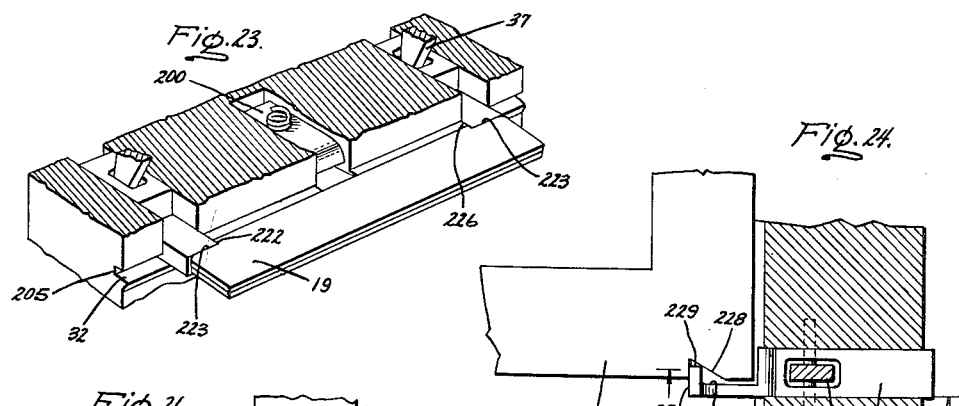
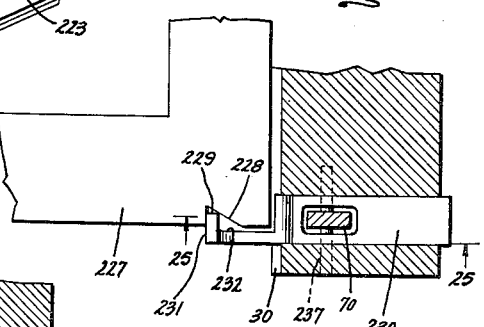
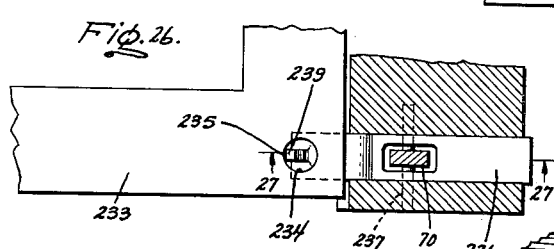
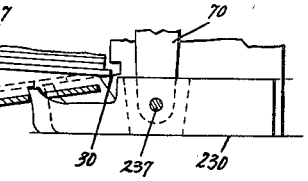
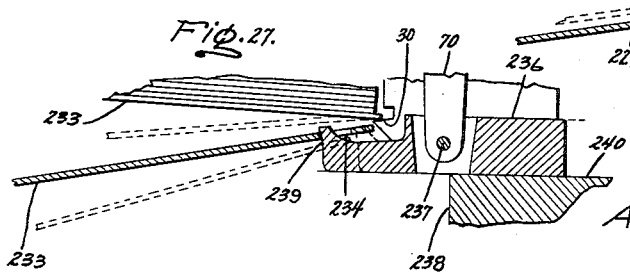
Inventor:
Armin F. Mittermaier,
by H. F. Manbeck, Jr.
Attorney.

United States Patent Office 3,023,493
Patented Mar. 6, 1962

3,023,493
APPARATUS AND METHOD FOR ASSEMBLING STACKED MAGNETIC CORES
Armin F. Mittermaier, Fort Wayne, Ind., assignor to General Electric Company, a corporation of New York
Filed Nov. 25, 1958, Ser. No. 777,172
18 Claims. (Cl. 29—203)

My invention relates to electric induction apparatus of the type including a stacked magnetic core, and more particularly it relates to an improved machine and method for automatically assembling the stacked core in such apparatus. This application is a continuation-in-part of my co-pending application Serial No. 692,820, filed October 28, 1957, now abandoned, and assigned to the same assignee as the present application.

In small induction apparatus such as dry-type transformers and reactors, the magnetic cores customarily comprise a stack of contiguous lamination layers. For example, in a conventional type of core, the core consists of a laminated stack in which each layer is formed of an E-shaped punching and an I-shaped punching. The E-shaped punching is located with its center leg extending through the window in the electrical coil of the apparatus, and the I-shaped punching is positioned across the ends of the legs of the E-shaped punching. In every other layer or in every second layer, the position of the punchings is reversed, that is, the punchings are inserted from the opposite sides of the coil, so that the butt joints in the various layers are bridged or overlapped by the adjacent layers. This bridging or overlapping, between the various layers gives a much better magnetic structure, as is well known in the art.

In another conventional core arrangement, long and short E-shaped punching are stacked in a similar manner to form the core. Each layer of the core includes a long E-shaped punching and a short E-shaped punching, and the direction of insertion of the punchings is alternated every other layer or every second layer to provide overlapping joints. Other well-known laminated cores use still different shaped punching and stacking arrangements.

All of these magnetic cores may, of course, be stacked by hand, but for both speed of assembly and reduced cost, it is desirable that they be assembled automatically. In other words, both the stacking time and the cost can be materially reduced if the core is assembled by a machine rather than by hand.

It is a general object of my invention to provide a new and improved machine for stacking laminated cores.

Another object of my invention is to provide a core stacking machine having improved means for releasing punchings from a magazine and inserting them into a core.

A further object of my invention is to provide a release arrangement for the magazines of a core stacking machine, which is effective to release the bottom punching or punchings from the magazines without jamming or other stoppage.

Still a further object of my invention is to provide a core stacking machine in which the stacking operation is automatically halted if the supply of punchings to the core should be interrupted for any reason.

Another object of my invention is to provide a new and improved method for assembling magnetic cores wherein the resilient means which supports the core during assembly later serves as a clamping means for holding the layers of the finished core tightly together.

Still another object of my invention is to provide an improved core stacking machine in which each lamination layer is automatically and positively aligned with the rest of the core as it is added thereto.

A still further object of my invention is to provide a core stacking machine in which the stacking operation is automatically interrupted if a punching should jam out of its desired position as it is inserted into the core.

My invention also has at its object the provision of an improved core stacking machine in which the stacking operation is automatically terminated for any size core when its proper stack height has been reached, without any presetting action of the operator being required.

In carrying out my invention I provide an automatic core stacking machine for assembling a laminated core within a prewound coil. In this machine, magazines are provided for holding stacks of core pnchings. These magazines include shoulder means which project inwardly from opposite walls thereof for supporting their respective stacks of punchings from the bottom. For releasing the bottom punching or punchings from the magazines, movable pusher means are provided which push the bottom punching or punchings first off one of the shoulder means and then off the other of the shoulder means. Upon its separation from the second shoulder means the punching or punchings fall downwardly from the magazine onto a track or surface beneath it. A reciprocable plunger movable in this track then slides the punching into the core for forming one of the layers thereof.

By a further aspect of my invention the core stacking machine is so constructed that it automatically stops operation if the supply of punchings should fail for any reason. Movable guides are provided for controlling the passage of the punchings into the core, and as the punchings pass these guides they cause the guides to move slightly. The guides are arranged for controlling certain switch means, and if the guides are not moved they cause the switch means to interrupt the machine operation.

By another aspect of my invention the machine is also provided with means for stopping the stacking operation once the desired size core has been obtained. The machine includes means for supporting the outer casing into which the core and coils are inserted during the stacking process and one of these supporting means is so arranged that it stops the stacking operation when the proper size core has been assembled. During the stacking operation in my preferred embodiment the core grows from the bottom, that is, the punchings are added to the core at the bottom, so that the top layer progressively moves further into the casing. When the core is of sufficient size so that the top layer butts against the retainer means provided at the top of the casing, the casing thereupon tends to move slightly in its supports. As a result of this movement the aforesaid supporting means is effective to operate a limit switch, and this switch in turn terminates the stacking operation. The completed core, coil and casing may then be withdrawn from the machine as a unit.

This same supporting means may also be used to interrupt the machine operation if a punching jams as it is inserted in the core. The jamming of the punching will cause a movement of the casing and the limit switch will thereby be operated just as if the assembly of the core were completed.

By still another aspect of my invention a single resilient member serves both as a support for the core during its assembly and also as a clamping means when it is completed. At the beginning of the stacking operation a clamp including a bowed center portion and upturned sides is passed through the window of the core. The ends of the clamp are engaged by a suitable support so that it is stressed upwardly in the middle and when the coil is placed in the machine the clamp is inserted with it. During the assembly operation, the core is at least partially supported by this resilient member. In particular, in my preferred embodiment, as each punching is slid in at the bottom of the core, its center leg rests on the upwardly stressed surface of the clamp. Then at the end of the stacking operation the ends of the clamp are released so that it attempts to assume its normal shape. As a result the center of the clamp engages the end of the coil and its upturned ends engage the stack, and thereby a force is applied to the core holding the laminations tightly together.

In addition to all of the above, my invention also includes various other advantageous features as will be described hereinafter, for example, gauging means for controlling the release of the punchings from the magazines, means for aligning the various core layers as they are assembled and means for progressively lifting the core to allow for the insertion of the new layers; and the subject matter I regard as my invention is particularly pointed out and distinctly claimed in the concluding portion of this specification. My invention, however, both as to organization and method of operation, together with further objects and advantages thereof, may best be understood by reference to the following description taken in conjunction with the accompanying drawings in which:

FIG. 1 is a side elevational view of an improved core stacking machine embodying my invention in one form thereof, the view being partially broken away to show details;

FIG. 2 is a perspective view showing two of the lamination layers of the core formed by the machine, each layer including two punchings, an E-shaped punching and an I-shaped punching;

FIG. 3 is a perspective view from the top of the machine of FIG. 1, the view being broken away to show one set of the magazines for the punchings and the means for releasing the punchings from the magazines and inserting them into the cores;

FIG. 4 is a vertical sectional view showing the positioning of the magazines relative to the core assembly area, the manner in which the core under assembly is supported, and the means for passing the punchings from the magazines into the core;

FIG. 5 is a vertical sectional view of one set of magazines included in the machine, showing in detail the means for releasing the punchings from the magazines;

FIG. 6 is a similar view showing the other set of magazines and the means for releasing punchings therefrom;

FIG. 7 is a fragmentary sectional view of the lower end of one of the magazines showing the bottom punching in position for ejection;

FIG. 8 is a similar view showing the bottom punching in an intermediate stage of the ejection process;

FIG. 9 is a similar view showing the bottom punching in the final stage of the ejection process;

FIG. 10 is a fragmentary sectional view taken on the line 10—10 of FIG. 5, showing the gauging means included in one of the magazines for controlling the release of the punchings from the magazine;

FIG. 11 is a fragmentary vertical sectional view taken on the line 11—11 of FIG. 10, also illustrating the gauging means of the magazine;

FIG. 12 is a fragmentary sectional view similar to FIG. 11, showing the gauging means of another one of the magazines;

FIG. 13 is a plan view showing in diagrammatic form part of the actuating mechanism for the various movable fingers and pushers included in the machine of FIG. 1;

FIG. 14 is a fragmentary perspective view showing in diagrammatic form the actuating means for the ejecting figures of one of the magazines;

FIG. 15 is a horizontal sectional view of a magazine for I-shaped punchings, having an alternate form of ejection means;

FIG. 16 is a perspective view of the magazine of FIG. 15 showing the bottom punching in an intermediate stage of the ejection process;

FIG. 17 is a similar view showing the ejection means in the final stage of the ejection process;

FIG. 18 is a fragmentary view showing the finished induction apparatus ready for removal from the machine of FIG. 1;

FIG. 19 is a perspective view showing a jig used for holding the core and the associated coil during the assembly operation;

FIG. 20 is a fragmentary vertical section of the jig showing one of the resilient support members included therein for supporting the core during assembly;

FIG. 21 is a perspective view of one end of the core and coil of the finished induction apparatus, the view being partially broken away to show the spring clamp used for holding the core laminations tightly together;

FIG. 22 is a fragmentary perspective view showing an alternate form of ejection means;

FIG. 23 is a fragmentary perspective view of the ejection means of FIG. 22 applied to a different shape of lamination;

FIG. 24 is a fragmentary plan view showing still another form of ejection means;

FIG. 25 is a fragmentary elevation view of the ejection means of FIG. 24 showing the bottom punching in an intermediate stage of the ejection process;

FIG. 26 is a fragmentary plan view showing still another alternate form of ejection means applied to a different shaped lamination; and FIG. 27 is a fragmentary elevation view showing the bottom punching in the modification of FIG. 26 in an intermediate stage of the ejection process.

Referring now to FIG. 1, I have shown therein a machine 1 for automatically assembling a laminated core within a prewound electrical coil. The various operating elements of the machine 1 which handle the core punchings are mounted on the upper surface or table top 2 of the machine, and they are actuated, as will be more fully explained hereinafter, from a longitudinally extending shaft 3 which is disposed beneath the table top. The shaft 3 is powered by an electric motor 4 through suitable clutch and brake means. Specifically, the motor 4 is connected by means of a belt and pulley arrangement 5 to a gear reduction mechanism 6. From the gear box 6, the drive passes through an adaptor or connecting mechanism 7 to a clutch 8. The clutch 8 is controlled by a solenoid 9 through a bell crank 10 so that when the solenoid is energized, the clutch is engaged, and when the solenoid is de-energized, the clutch is disengaged. The output shaft of the clutch 8 is in turn connected to a brake 11 which is also controlled by the bell crank 10. The brake 11 is so arranged with regard to the bell crank that it is disengaged whenever the clutch 8 is engaged, and, vice versa, is engaged whenever the clutch is disengaged. The brake is effective to stop the rotation of the driven elements very rapidly whenever it is engaged. From the brake the drive passes through a shaft 12 which is mounted in a suitable bearing block 13. The shaft 12 has mounted on it a sprocket 14 which is connected by a chain 15 to a similar sprocket 16 on the upper shaft 3. As a result of this sprocket connection, the shaft 3 is turned whenever the clutch 8 is engaged and the brake 12 disengaged, and it is rapidly stopped when the clutch is disengaged and the brake engaged.

The machine 1 is particularly adapted and arranged to assemble a laminated core within a prewound electrical coil of the type shown at 17 (see FIG. 19). Specifically, in the illustrated embodiment, the machine assembles the core from punchings such as are illustrated in FIG. 2. In other words, it assembles a laminated core, each layer of which comprises an E-shaped punching 18 and an I-shaped punching 19. The E-shaped punching 18 and the I-shaped punching 19 each contain recesses 220, 222; each recess has at least one edge portion 221, 223 located toward the center or front side of the punching with respect to the rear edge or back side thereof. (By "front side" or "back side" as herein used, I mean the side adjacent to the core assembly region 23, as hereinafter described, and the side remote from the core assembly 23, respectively.) In alternate layers, the direction of insertion of the punchings is reversed so that the butt joints between the E-shaped punchings and the I-shaped punchings are overlapped from layer to layer. In the finished core, the center legs 20 of the E-shaped punchings extend through the window or opening 20a in the coil 17 and the outer legs 21 of the E-shaped punchings extend on opposite sides of the coil sides. Simultaneously as the machine 1 assembles the punchings 18 and 19 within the coil to form the core, it inserts the coil and the core in an outer casing 22. The casing 22 is shown particularly in FIGS. 1, 4 and 18.

In the machine, two sets of magazines are provided for holding the E-shaped and I-shaped punchings (For purposes of brevity these punchings will hereinafter be referrred to simply as E punchings and I punchings.) The two ests of magazines are positioned on each side of the core assembly region or area, which is generally indicated at 23, and each set includes one magazine for the E punchings and a second magazine for the I punchings. Thus, an E magazine 24 and I magazine 25 are positioned on one side of the core assembly area 23, and an E magazine 26 and an I magazine 27 are positioned on the other side of the assembly area (FIGS. 1 and 4). To form the core, each time an E punching is fed from the magazine 24, an I punching is fed simultaneously from the magazine 27 and butted against it. Likewise, whenever an E punching is released from the magazine 26, an I punching is released from the magazine 25 to complete the layer. In the illustrated machine, the punchings are reversed in every other layer. That is, in one layer the E punching is fed from magazine 24 and the I punching from magazine 27, and in the next layer the E punching is fed from the magazine 26 and the I punching from magazine 25. Thus the butt joints in each layer are lapped by the punchings on the layers on either side of it.

It will be understood, however, that my invention is not necessarily limited to this reversal of the punchings in each layer. If desired the machine may be so arranged that two punchings will be released at a time from each magazine, whereby the punchings will be reversed every two layers instead of every other layer. In fact, if desired the machine can be arranged so that the punchings are released three at a time and thereby reversed only every three layers in the core. However, it has been found that reversing them every three layers does not give as advantageous a magnetic core as if they are reversed every other layer or every second layer.

As may be clearly seen in FIG. 4, each of the magazines 24–27 is inclined so that it holds its stack of punchings in a slanted relationship. Specifically, the punchings are slated in the magazines so that their ends adjacent the coil assembly area 23 are higher than their rear ends. The punchings are supported in the magazines from the bottom. That is, in each magazine, the bottom punching rests on suitable shoulders provided on the front and rear walls of the magazines. The shoulder arrangements are identical for the E punching magazines 24 and 26 and are also identical for the I punching magazines 25 and 27. Thus, the same reference numerals will be used for both E punching magazines and for the I punching magazines.

Referring particularly to FIGS. 5 and 6, it will be seen that in the E magazines 24 and 26, stationary shoulders 29 protrude from the front wall of the magazines so as to engage the outer ends of the legs of the bottom E punching. Likewise, on the rear wall of each magazine, a shoulder 30 extends inwardly so as to engage the center portion of the cross piece of the E punching. The engagement between these projections or shoulders 29 and 30 and the opposite sides of the bottom punching is effective to support the stack of E punchings within each magazine. The shoulders for supporting the punchings in the I magazines 25 and 27 are best seen in FIGS. 4 and 6. As is there shown, a stationary shoulder 31 extends inwardly from the front wall of each magazine to support the bottom I punching on one side, and a shoulder 32 projects inwardly from the rear wall of each magazine to support the bottom I punching on the other side. The bottom I punching, of course, supports the whole stack above it.

The means whereby the E and I punchings are moved off the stationary shoulders for release from the magazines form one important aspect of my invention. In both the E punching magazines and the I punching magazines, the release or discharge of the bottom punching or punchings is effected by means of movable pusher or finger means mounted in the walls of the magazines. Except for reversed positions these finger or pusher means are identical respectively for both the E magazines and for both the I magazines so that the same reference numbers will be used for the corresponding elements in the opposite magazines.

Taking first the I punching magaziens 25 and 27, it will be seen that two movable finger or pusher elements 33 are mounted in the front wall of each of these magazines and similar movable fingers or pushers 34 are mounted in the rear wall of each magazine (FIGS. 3–6). These fingers or pushers 33 and 34 are effective respectively to move the bottom I punching first off the shoulder 31 and then off the shoulder 32 of each magazine, whereby the punching is dropped out of the magazine through the opening 35. The pushers 33 and 34 are slidably mounted on transverse surfaces in the walls of the magazines 25 and 27, and they are actuated respectively by means of arms 36 and 37. The arms 36 and 37 are connected to the pushers 33 and 34 by pivot pins as shown, and they are themselves driven respectively by shafts 38 and 39. A preferred mechanism for actuating the shafts 38 and 39 will be explained hereinafter.

The pushers 33 and 34 include top surfaces or landings at their outer ends which are inclined slightly from the horizontal, and the pushers are spring biased upwardly by means of springs 40 and 41 respectively so that these inclined surfaces normally engage the underside of the bottom punching or lamination of the stack. It is possible that the bottom punching may be bowed or warped so that it does not lie flat on or conform to the stationary shoulders 31 and 32 of the magazine. However, by reason of bias applied by springs 40 and 41 the pushers 34 and 35 move around their pivot pins into the desired engagement with the punching even if it is bowed or warped. In other words the pushers "hunt" the bottom punching. This "hunting" action insures that the pushers are always in the proper position relative to the bottom punching to release it from the magazine when the time comes for that to take place.

To release or discharge the bottom I punching from either magazine, the associated pushers 33 are first moved inwardly by the arm 36 so that shoulders 42 on their upper surfaces engage the adjacent or front side of the bottom punching. Having so engaged the bottom punching, the pushers 33 continue to move inwardly into the magazine and as they do, they push the front side of the lamination off the stationary projection 31 supporting that side of the stack. Simultaneously as the front side of the bottom I punching is moved off the stationary shoulder 31, the back side of the punching is moved onto the upper surface of the opposite fingers or pushers 34. It will be noted that the rear wall of each of the I magazines is provided with a longitudinal slot 205 (FIG. 12) to permit this rearward movement of the bottom punching, the punching being moved into this relatively wide mouthed slot as it is carried rearwardly.

To insure positively that only the bottom punching is moved by the pushers 33, a control member or gauge 200 is pivotally mounted in the rear wall of each of the I magazines 25 and 27 (FIG. 12). The gauge 200 is disposed in a centrally located slot which extends through the shoulder 32, and, as shown, the gauge is biased by a spring 201 so that its outer end tends to move upwardly. Specifically, it is biased by the spring 201 so that the level or landing 202 at its outer end "hunts" the bottom punching in the stack, always engaging its under surface. Thus no matter how the bottom punching may be warped or bent with regard to the stationary shoulder 32, the landing 202 moves into engagement with it.

Rearwardly of the landing 202 the gauge 200 is provided with a slot 203 which is relatively narrow at its mouth and widens in the back of the mouth. The slot is, in fact, generally triangular in shape, with its base wall remote from the mouth sloping rearwardly from bottom to top. This slot 203 provides the actual gauging or selecting function of the member 200.

The mouth of the slot 203, as shown, is made just wide enough to accommodate one punching but not two. Thus as the bottom I punching is pushed rearwardly by the pusher or finger 33, it can and does move into the slot 203. The punching next above the bottom punching cannot, however, move with the bottom punching. Rather, if the next punching should start to move by reason of the frictional engagement between it and the bottom punching, it immediately butts against the generally vertical surface 204 of the gauge above the slot. The surface 204 holds this punching from movement as the bottom punching moves rearwardly into the slot 203 through the narrow mouth; and thereby it is positively insured that only the bottom punching and none of the punchings above it are moved off the shoulder 31 by the action of the pushers 33.

As the bottom punching moves into the slot 203 of the gauge 200, it also moves, as mentioned above, onto the upper surfaces of the rear pushers 34. After the bottom punching has cleared the shoulder 31 and moved onto the pushers 34, the inward movement of the pushers 33 then stops, and the arm 36 begins to move in the reverse direction carrying the pushers 33 with it. After the outer ends of pushers 33 clear the front side of the punching, for example, by about one sixteenth (1/16) of an inch, the punching then flexes or slants downwardly due to the pressure of the stack of punchings above it. This position of the bottom I punching with the pushers 33 retracted is shown in FIG. 4 for magazine 27 and is, of course, the same for magazine 25. The widening of the gauge slot 203 back of its mouth allows this slanting of the punching to occur without interference by the gauge 200.

After the pushers 33 have cleared the front side of the punching, the rear pushers 34 then move forward and shoulders 43 on their upper surfaces engage the rear side of the bottom I punching. The pushers 34 continue to move forward after they engage the bottom punching, and they move far enough to push the punching off the stationary shoulder 32. As the punching is moved off the shoulder 32, it is also carried out of the slot 203 in the gauge 200 so that it is no longer held by the gauge. The upper surfaces of the pushers 34 in front of shoulders 43 are inclined slightly downwardly and once the rear side of the punching clears the shoulder 32 and the gauge 200, the punching then slides off the pushers and drops downwardly through the opening 35 onto a guide member 44 positioned beneath it. (See FIG. 5.) From the guide 44, the punching is moved automatically into the core being assembled, as will be explained in detail hereinafter.

It will be understood, of course, that as the sides of the bottom I punching are pushed first off the stationary projection 31 and off the stationary projection 32, the I stack moves downwardly so that the next punching replaces the bottom punching first on one side and then on the other. The next punching rests initially on the surfaces of the fingers behind the shoulders 42 and 43, and then drops onto the stationary shoulders 31 and 32 as the fingers retract within the magazine walls. Thus upon the next movement of the pushers in the sequence described above, the same result occurs, that is, the new bottom punching is released from the stack and the one next above moves down to take its place. In the illustrated embodiment only one punching is released or ejected at a time, but it will be seen that by making shoulders 42 and 43 of greater height and by widening the mouth of the slot 203 in gauge 200, two punchings at a time can be released from the bottom of the stack. In other words the bottom two punchings can be moved together first off the shoulder 31 and then off the shoulder 32 so that they will fall together out of the stack. As mentioned above, a suitable core may be formed by stacking two layers at a time with their punchings oriented in the same manner, so that for some applications it may be desirable to have the machine 1 operate in such a manner. Of course, three or even more punchings could be released from the magazines at once, but ordinarily it is felt that no real advantage is gained by stacking more than two layers of the core simultaneously.

Referring now to FIG. 14, I have shown therein a preferred mechanism whereby the shafts 38 and 39 may be operated so as to move the pushers 33 and 34. The mechanism is driven by means of a cross shaft 46 which is turned from the main drive shaft 3 by means of bevel gears 47 and 48. (See FIG. 13.) At its end remote from the gears, this shaft 46 has mounted on it a cam 49 which operates a pivoted lever 50 through a cam follower or roller 51. The lever 51 is pivoted to a suitable supporting member by means of a pivot pin 52 and it moves about that pin in accordance with the action of the cam 49 on the follower 51. It will be noted that the cam follower 51 is spring biased against the cam by means of a spring 53 connected to the lower end of the lever. At its upper end the lever is slotted, as indicated at 54, to receive a projecting pin 55 which is attached to a cross arm 56. This cross arm 56 is in turn connected to two links 57, 58 by means of suitable pivot pins; and the links 57 and 58 are attached respectively to the shafts 38 and 39 so as to turn them whenever their lower ends are moved by the cross arm 56. The shafts 38 and 39 may be attached to the upper end of the links by any suitable means, as for example by a set screw or by a key, and are journaled in the walls of the associated magazine.

The connection between the cross arm 56 and the link 57 is such that there is no lost motion between the two members. In other words, as the cross arm 56 is moved back and forth longitudinally by the lever 50, the lower end of the link 57 always moves with it. As a result the shaft 38 is moved whenever the cross arm 56 moves. The connection between the arm 56 and the link 58, however, comprises a lost motion connection. That is, the link 58 is attached to the arm 56 by means of a pin and slot connection 59 in which the slot is longer than the diameter of the pin. As a result it will be seen that some movement of the arm 56 may occur at certain times without a corresponding movement of the link. For example, in the illustrated position the arm 56 may move to the left for some distance, carrying the pin, before it begins to pick up the link 58. It will be noted that the link 58 is spring biased to the left against a stop 60 by means of a suitable spring 61.

The cam 49 is so arranged with one high spot or rise and one recess or depression that it moves the lever 50 back and forth once per revolution. This back and forth movement of the lever 50 has the above described result on the pushers 33 and 34. In other words, it results in the shafts 38 and 39 being turned so as to move the pushers in the desired sequence whereby the bottom I punching is pushed first from the stationary shoulder 31 and then from the stationary shoulder 32. The two movements of the pushers 33 which occur without movement of the pushers 34 are both provided by reason of the lost motion connection 59. In other words, by reason of the lost motion connection, link 58 thereby pushers 34 are not moved during the period when link 57 and shaft 38 move pushers 33 so as to clear the punching from shoulder 31, or during the period when the pushers 33 are retracted from the front side of the punching. It will be understood of course, that identical mechanisms of this sort may be used for the releasing fingers of both the I punching magazines 25 and 27.

The means for releasing the bottom punching or punchings from the E punching magazines 24 and 26 are shown in FIGS. 3 through 9. Except for opposite arrangement, the two magazines include identical pusher or finger arrangements for releasing the E punchings, and these identical members will be given the same numbers for both magazines. The bottom E punching is released from each magazine by finger or pusher means which first move the ends of its legs off the stationary projections 29 and then move its cross bar off the stationary projection 30. After having cleared both these projections, the bottom E punching is, of course, free to fall out through the bottom opening 62 of the magazine.

For moving the ends of the legs of the punching off the projections 29, there are provided a pair of slidable fingers or pushers 63. These fingers 63 are slidably mounted in the wall of the magazines 24 and 26 as may be seen in FIGS. 3 and 6, and they are moved by means of levers 64. The levers 64 are connected to the fingers 63 by suitable pivot pins and are themselves operated by a shaft 65. The pushers 63 are biased upwardly around the pivot pins by means of suitable springs 66 so that they "hunt" the bottom punching in the stack. In other words the pushers 63 are biased by the springs 66 so that they engage the bottom E punching no matter how it may be bowed or warped relative to the stationary shoulder 29 of the magazine. This hunting action insures that the effective operation of the pushers will not be affected by the bowing or warping of the punching. The pushers 63 specifically engage the bottom E punching on the front side of its cross bar.

To release the bottom E punching from each magazine, the associated pushers 63 are moved rearwardly so that shoulders 67 on their top surface engage the cross bar of the E in the bight portions between its legs. After engaging the cross bar, the fingers or pushers 67 then push the bottom punching rearwardly so that the ends of its legs clear the stationary projections 29 at the front of the magazine. Simultaneously, the rear side of the cross bar is moved backwardly over the outer edge of a pair of rear fingers or pushers 68 (FIGS. 6 and 7). It will be noted that the rear wall of each of the E magazines is provided with a relatively wide mouthed, longitudinal slot 215 (FIG. 11) to permit the rearward movement of the bottom punching onto the pushers 68, the punching moving into this slot as it is carried rearwardly. The pushers 68 are themselves slidably mounted in the rear walls of the E magazines 24 and 26 and are actuated from shafts 69 through suitable levers 70; and as will be explained shortly, the pushers 68 are effective in both E magazines to clear the cross bar of the bottom punching from the rear stationary projection 30.

To insure that only one E punching at a time is moved first by the pushers 67 and then by the pushers 68, a control member or gauge 210 is mounted in the rear wall of each of the E magazines (see FIGS. 10 and 11). The gauge 210 is positioned in a centrally located slot which extends through the shoulder 30, and it is biased by a spring 211 so that its outer end "hunts" the bottom punching. In particular, it is biased so that a level or landing 212 at its outer end is moved into engagement with the bottom E punching even if the punching is bowed or warped with regard to the shoulder 30. This hunting action is illustrated in FIGS. 7, 8, 9, and 11 where the bottom punching in the stack is shown as bowed off the shoulder 30 in the region of the gauge 210.

Rearwardly of the landing 212 the gauge 200 is provided with a generally triangular shaped slot 213, which is narrow at its mouth and widens in back of the mouth. The narrow mouth of the slot is wide enough to accommodate one E punching but not two. Thus as the pushers 63 move rearwardly. the bottom E punching can and does move in to the slot 213. The punching above the bottom punching, however, cannot move with it even though there is some friction between them. If this next punching should start to move, it immediately butts against the generally vertical surface 214 of the gauge above the slot 213; and it is held from moving by this surface. Thus the bottom punching and only the bottom punching is moved off the shoulder 29 by the pushers 67.

After the front fingers or pushers 63 have moved the punching far enough that its legs clear the projections 29, they are then retracted forwardly until they themselves clear the cross bar of the punching. When a sufficient clearance has been obtained, for example, one sixteenth (1/16) of an inch, the rear pushers 68 then move forwardly. As shown, they include shoulders 71 on their upper surfaces and these shoulders 71 engage and push against the rear side of the cross bar of the punching. The pushers 68, it will be noted are spring biased upwardly by a leaf spring 72 to "hunt" the punching and insure this engagement.

Having engaged the punching, the pushers 68 then move it forwardly until the punching clears the rear stationary projection or stop 30. As the punching is moved off the stop 30, it is also carried out of the slot 213 in the gauge 210 so that it is no longer held by the gauge. Once it clears the rear projection and the gauge, the bottom punching then falls freely out of the magazine through the opening 62 (see the dotted lines in FIG. 6). The sequential steps of the rear fingers 68 are shown in FIGS. 7, 8, and 9, and referring particularly to FIG. 8, it will be noted that the bottom punching tends to flex or slant downwardly as soon as the front fingers 63 retract from engagement with them. Thereby it is insured that the legs do not again engage with the stationary holding projection 29 when the punching is pushed forward by fingers 68 as shown in FIG. 9. Such re-engagement of the legs would, of course, prevent the punchings from falling freely from the magazine. The widening of the slot 213 in the gauge 210 allows the slanting to occur without interference from the gauge.

It will be understood that as the bottom punching is released from each of the E magazines 24 and 26, the next punching moves down and takes its place on the stationary projections 29 and 30. In other words each time a punching is released the stack as a whole moves down one punching to provide a continuous supply to the releasing means.

The same type of actuating mechanism may be used for the finger means of the E magazines as for the finger means of the I magazines. In other words, mechanisms similar to that shown in FIG. 14 may be employed. In particular, in my preferred embodiment, I prefer to use substantially identical mechanisms and actuate them from the same cams as are used for the I magazines. Thus for example, in my preferred embodiment, the finger means of the E magazine 24 are operated from the cam 49 through the same type of lever and linkage mechanism as operates fingers of the I magazine 25.

In the illustrated embodiment, only one E punching is released from the E magazines 24 and 26 at a time. However, it will be realized that the releasing means may be readily adapted to release two punchings at a time. Specifically, by changing the height of the shoulders 67 and 71 on the two pusher elements and by widening the mouth of the slot 213 in gauge 210, two punchings may be cleared from the magazine projections 29 and 30 at a time. In fact, if desired, three or more punchings could be cleared at a time. However, as mentioned above, it is not ordinarily desirable to have more than two laminations in a row in the finished core with their punchings oriented in the same fashion.

As mentioned above, when the bottom I punching is discharged from the I magazines 25 and 27, it falls onto a guide 44 positioned below the magazine. The bottom E punching discharged from the magazines 25 and 26, however, falls directly onto the top surface of the table top 2. The E punching specifically falls onto a track or guideway 73 formed on the table top between two side rails 74 and 75 (FIG. 3). An identical track is formed on both sides of the core assembly area 23 so that the same number is used for both. The guides 44 on to which the I punchings fall are positioned in the upper portion of these tracks as may be seen in FIGS. 5 and 6 so that in effect the I punchings also are discharged into the tracks.

To move the I and E punchings along the tracks 73 into the core being assembled, pusher members 76 are provided in each of the tracks (see FIG. 3). These pusher members or bars 76 are reciprocably movable within the tracks; and on either side of core assembly area 23 they are withdrawn to the rear of the track 73 whenever a punching is being discharged from either of its associated magazines. Then after a punching is discharged, the pushers 76 are moved forwardly along the track, and engage the punching with their front ends as may be clearly seen in FIG. 3, and push the punching ahead of them into the core being assembled.

One suitable mechanical drive for the pushers 76 is shown in FIG. 13. Only the drive for the left-hand set of pushers is illustrated but it will be understood that an identical drive is also included in the machine for the right-hand set of pushers. As is indicated in FIG. 13, the two pushers in each track 73 are slidably mounted in the track by means of slots 77 in the table top 2. The pushers are both actuated from a cross pin 78 which is moved back and forth under the table top by a bell crank 79. The bell crank 79 is driven from the shaft 3 through a drive including bevel gears 80 and 81. The output gear 81 drives a shaft 82 having a link 83 pinned to its outer end. The bell crank 79 is pivotally attached to the outer end of the link 83 by a suitable pivot pin 84, and thus as the shaft 82 rotates, the bell crank is so moved as to reciprocate the pin 78 and the pushers 76 back and forth along the track 73.

The pusher gears 80 and 81 are so arranged that the shaft 82 for each set of pushers 76 is driven at twice the speed of the shafts 46 which operate the discharge fingers of the magazines. This has the result that the pushers 76 are moved back and forth twice in the tracks 73 for each revolution of the finger operating cams 49. The cams 49 themselves are so arranged that for each revolution thereof, one E punching and one I punching is dropped out of the associated set of magazines. In other words, taking the magazines 24 and 25, first an I punching is dropped out of the magazine 25 and then an E punching is dropped out of the magazine 24 for each revolution of the cam 49 driving their respective discharge fingers. This has the result that on one back and forth movement of the pushers 76 on the right side of the core assembly area 23 (as viewed in FIG. 3), an I punching is pushed into the core, and on the next movement an E punching is pushed into the core.

The ejecting fingers and the pushers 76 on the left hand side of the core assembly area 23 (as viewed in FIG. 3) are arranged in the same way as those in the right hand side except that at any time they operate to bring the other type of punching into the core. In other words, when I punching is dropped out on the right side of the assembly area, an E punching is dropped into the track on the left hand of the assembly area, and when an E punching is released on the right hand side, an I punching is released on the left hand side. Thus each time that the pushers 76 on the one side of the core move an I punching into the core, the pushers on the other side move an E punching into it, and vice versa. This action may be readily accomplished by having the rise and the depression in the cam 49 driving the discharge fingers of the one set of magazines displaced 180° from the same rise and depression in the cam driving the ejecting fingers of the other set of magazines. Reiterating, each time that the pushers 76 move an I punching down the right hand track 73, the opposite pushers being an E punching down the left hand track to mate with it, and each time the right hand pushers bring down an E punching, the left hand pushers bring down an I punching.

It will be understood, incidently, that the guides 44 onto which the I members are discharged from the magazines 25 and 27 are relatively short members and that the pushers 76 pass on either side of these guides as they move down the track 73. Thus, they contact the ends of the I punchings protruding beyond the sides of the guide and carry the I punchings forward with them.

To explain the manner in which the machine 1 assembles a finished core, it will first be noted that the core assembly area 23 is defined by four corner posts 85. As will be explained hereinafter, these posts 85 support the casing 22 of the induction apparatus during the assembling of the core. They also mount two transversely extending guides or shoes 86 for controlling the movement of the punchings into the core. The guides 86 are slidably mounted in posts by tongue and groove connections 87 (FIG. 3) and as the punchings pass under them, they move up and slightly with regard to the posts. This movement, as is explained later in detail, is used in my preferred machine to provide a "fail safe" feature.

Located in the table top 2 in the area between posts 85 is an aperture 88 (see FIG. 4), and in order to assemble the laminated core within the coil 17, the coil is placed within this aperture with the opposite sides of its window 20a facing the punching magazines. As a first step however, before the coil is placed within the aperture 88, it is first provided with side insulators 89 (FIG. 19) which may be formed of any suitable insulating material, for example, cardboard. Also, after the insulators 89 are placed over the coil sides and before it is inserted through the aperture 88, the coil with the insulators on it is placed in a support or jig 90 as shown in FIG. 19. For the placing of the coil within it, the jig 90 may be conveniently supported on a mount 91 provided on the table top 2 (FIGS. 1 and 19). Besides the coil 17, there is additionally inserted into the jig a spring clamping member 92. As may be clearly seen in FIG. 19, this spring clamp 92 includes a bowed center portion 93 and up turned side portions 94 and when the clamp is placed into the jig, its ends are so held that the center is bowed up even more than normal. In other words, the ends of the clamp are compressed together by the jig so that the center portion 93 is stressed upwardly.

After the coil 17 and the clamp 92 have been placed in the jig, they and the jig are removed as a unit from the mount 91 and inserted in the aperture 88 in the table top. As is best shown in FIG. 4, the jig 90 then rests upon a ledge or shoulder 95 provided slightly below the table top by a stationary supporting member 131. The coil 17, however, fits down through an interior aperture 96 in the shoulder 95 so that its top end rests on the clamp 92. In other words, the coil is completely loose and is supported only by the clamp 92.

With the coil in place, the housing or casing 22 is then inserted into the coil assembly area 23. Specifically, in the illustrated embodiment, the casing 22 includes four posts or legs 97 and these legs 97 are inserted downwardly on the inner side of the machine posts 85. To hold the casing in place, suitable apertures 98 are provided in the lower ends of the legs 97 and these apertures are engaged with buttons 99 provided on the inner surfaces of the posts 85 (FIG. 3). As will be explained hereinafter, one of these buttons 99 is movable and serves as a limit means for stopping the machine when the assembly of the induction apparatus is completed.

With the casing 22 in place, the leads 100 of the coil 17 are fitted upwardly through the top part of the casing, and the coil and casing are then in condition for the assembly operation of the machine 1.

With the coil 17 and the casing 23 in place, and assuming the magazines 24, 25, 26, and 27 to be loaded with punchings as shown, the motor 4 and solenoid 9 are then energized to place the machine 1 in operation. With machine running the releasing pushers or fingers of the magazines 24–27 are actuated in the manner described above so as to discharge punchings intermittently from the magazines. Specifically, an I punching is dropped from the magazine 25 simultaneously with an E punching from the magazine 26 and shortly thereafter an I punching is dropped from the magazine 27 simultaneously with an E punching from the magazine 24. Each time punchings are dropped, the pushers 76 move forward so as to move the punchings into the core assembly area from both sides, and retract for the next punching to be released from the magazines.

As the punchings are moved forward in the tracks 73 into the core assembly area, the first pass under spring members 101 mounted on the guides 86 (FIG. 4). The punchings then pass between the lower ends of the guides 86 and an inclined surface 102 of the table top. Having passed under the lower ends of the guide 86, the punchings are next tilted upwardly by the side surfaces 103 of the jig 90. The surfaces 103 of the jig are clearly shown in FIG. 19 and their action on the E punchings in particular is shown in FIG. 3. From the surfaces 103, the legs of the E punching then pass into and around the coil 17. Specifically, the center leg 20 is pushed through the window of the coil and the side legs 21 are passed around the sides of the coil. Simultaneously, an I punching is moved in from the opposite side of the core into abutting relationship with the ends of the legs so as to form a complete lamination layer of the core.

As mentioned above, the guides 86 are slidably mounted in the post 85 so that they may move upwardly slightly as the punchings pass underneath them. In the illustrated machine 1, this movement of the guides 86 is used to provide a "fail safe" feature. As is shown in FIGS. 3 and 13, two switches 104 and 105 are positioned adjacent the guides for actuation by them. A longitudinally movable operating rod 106 extends from the switch 104 into one of the posts mounting the right-hand guide 86 (as viewed in FIGS. 3 and 13), and a similar operating rod 107 extends from the switch 105 into one of the posts mounting the left-hand guide 86. These rods extend through the posts into the slots or grooves mounting the guides and cooperate with depressions (not shown) in the edges of the guide flanges. Each time the guides are moved upwardly, they actuate, i.e., move, the rods so that the rods operate the switches 104 and 105. The switches 104 and 105 are connected in a suitable circuit whereby if they are operated, they allow the machine to continue in operation. However, if for any reason either guide should not be raised upwardly due to a failure in the supply of punchings, its associated switch is thereupon effective to interrupt the machine operation. Thereby, insertion of punchings from one set of magazines without the insertion of punchings of the other set is positively avoided. It will be understood, of course, that the switches 104 and 105 may be connected in any suitable circuit to effect this result.

It will be noted that the punchings as they move into the core being assembled, are fitted over the clamp 92 between it and the top of the coil 17. More specifically, they are fitted between the clamp and the bottom layer of the core under assembly so that the core grows from the bottom. By this action the coil is moved upwardly by the insertion of the punchings themselves so as to make room for the next layer of punchings. The spring clamp serves to support the center leg of the core during the assembly process as is shown in FIG. 4 wherein core under assembly is indicated at 108. The two outer legs of the core, it will be understood, rest on and are supported by the upper surfaces 103a of the jig 90. When any layer of the core is in position, that is, when both the I punching and the E punching have been moved together in abutting relationship, the sides of the layer are then supported by spring biased heads 109 on the jig. As may clearly be seen in FIG. 20, these heads 109 are slidably mounted on suitable pins 110 and are biased upwardly by coil springs 111. Due to their resilient mounting, the heads 109 may move downwardly to allow the passage of the punchings into the core 104 and then after the punchings are inserted provide a resilient support for them.

Each time a layer is formed in the core, the jig 90 is then moved upward slightly by means of a lifting arm 112 (see FIG. 4). This arm 112 includes four pins 113 at its upper end which engage downwardly extending pins 114 provided on the jig. After an E punching and an I punching have been slid into position from opposite magazines, the arm 113 is then moved upward so as to raise the jig slightly. The mechanism for producing the movement of the arm 112 is not shown since it will be understood that any suitable means may be used and actuated from the shaft 3. The arm 112 is then retracted before the next set of punchings are slid into the core 108. In other words, the jig is allowed to return to its normal position on shoulder 95 before the next layer is added at its bottom.

The purpose of so raising and lowering the jig 90 after each lamination layer is formed and before the next one is pushed into place, is to provide room for the next layer. As the first few lamination layers are stacked, the core or stack 108 merely rides up and down with the jig. However, after the core 108 reaches a certain thickness, it is then engaged by rubber clamps 115 (FIG. 3) each time the jig is moved upwardly. The rubber clamps 115 are mounted between the posts 85, on opposite sides of the core assembly area 23, and they are retracted as the arm 112 moves the jig and the core upwardly together. But when the arm 112 reaches its zenith, the clamps 115 move inwardly so as to engage the core 108. The core is thereby held stationary as the arm 112 moves downwardly to allow the jig to return to its normal position. By this action a space is provided between the upper surface of the jig and the bottom most layer of the core to allow the next layer of punchings to be inserted into the bottom of the core.

The clamps 115 are also operated from the main shaft 3 of the machine. Specifically, they are operated by cams (not shown) which are mounted on a shaft 116. The shaft 116, as shown in FIG. 13, is driven from the shaft 3 through a sprocket and chain drive 117 and it carries a suitable cam which operate levers 118 (FIGS. 3 and 13). The levers 118 engage longitudinally movable rods 119 at their upper ends and these rods 119 in turn operate the rubber clamps 115.

In addition to operating the clamps 115, shaft 111 also operates a plurality of movable tongues 120 which are positioned on opposite sides of the clamps. The purpose of the tongues 120 is to "square up" or align the bottom layer of punchings after they have been inserted into the core. Specifically, after the pushers 76 have been moved the E and I punchings into place, the tongues 120 are then moved inwardly from their position shown in FIG. 3. The tongues include shoulders or tabs 121 at their outer ends, and the punchings are engaged at their outside corners between tabs 121 and the adjacent surfaces of the tongues as the tongues move inwardly. The punchings as a result are moved or shifted so that they are brought into alignment with the rest of the core and the opening between the legs 97 of the housing 22. The tongues are then retracted and the core moved upwardly by the actuating arm 112 and the jig 90 before the next layer of punchings is inserted. As may be seen in FIG. 2 the tongues 120 are slidably mounted in the posts 85 and are actuated by means of levers 122. The levers 122 may be operated by any suitable means, as by cams on shaft 116.

To explain again briefly the sequence of operation of the machine 1, assume that the machine is in its condition wherein an I punching has been dropped from the magazine 25 into the right hand track 73 and an E punching has been dropped from the magazine 26 into the left hand track 73. The next step is that the pushers 76 move forward and push these respective punchings into the core assembly area 23. The punchings move into the core under the springs 101 and the guides 87 and up the surfaces 103 of the jig until they are butted against each other. The center leg of the E punching, of course, passes through the window of the coil and its side legs on the opposite sides of the coil to produce this result. With the lamination layer thus completed, the clamps 115 are retracted and the tongues 120 move inwardly to "square" the layer as the pushers 76 are withdrawn. Also, as the pushers 76 continue to move back, the tongues 120 are retracted and the core is moved upwardly by the actuating arm 112. The rubber clamps 115 then come in to hold the stack up and the arm 112 returns downwardly. By this time the pushers 76 have retreated to the back ends of their respective tracks and thereupon an I punching is dropped from the magazine 27 and an E punching from the magazine 24. The same exact sequence then occurs as before with the result that a new lamination layer is formed below the last one with the punchings oriented in an opposite direction.

The machine continues to operate in this manner, alternating the orientation of the punchings in each layer, until the desired size core is formed. Only if the supply of punching fails is the operation interrupted. Upon such occurrence the switches 104 and 105 actuated by the guides 87 are effective to interrupt the operation automatically.

Each time a layer is formed at the bottom of the core the coil is, of course, moved upwardly by the top of the core, and as the core grows, both the core and coil extend upwardly into the casing 22 between its legs or posts 97. As the core reaches its desired size, its top layer engages suitable retaining means provided in the casing 22 adjacent the tops of the posts. For example, in the illustrated case these retaining means comprise plates or lugs 123 formed on the inner surfaces of the posts (FIG. 18). When the top lamination layer of the core engages these retainers 123, it tends to cause the casing 22 to move; and as a result of this movement, a force is applied to the buttons 99 which hold the posts and thereby the casing during the assembly process. In my preferred embodiment, the one button 99 is connected by means of a shaft 124 (FIG. 3) to a switch 125. When the top of the core engages the retainers 123, the resulting movement of the casing causes the button 99 to operate the switch 125 through the shaft 124. The operation of the switch 125 opens the circuit to the clutch and brake solenoid 9. This stops the operation of the machine automatically with a laminated core of the correct size being formed, the finished core being shown at 126 in FIG. 18. It will be obvious that this automatic shutdown will occur at the proper time for any height core without any presetting action of the operation being required. When the core reaches the proper size and butts against the retaining means in the case, the machine stops running automatically, without the operator having to take any action from one size core to the next. The connection of the switch 124 for controlling the clutch trip, solenoid 9 is not shown since it will be obvious that any suitable circuit may be used.

It will be noted that the switch 125 is also effective to interrupt the machine operation of a punching should it jam as it is being pushed into the core during the assembly process. The jamming of the punching causes the casing 22 to move just as it does when the core is completed and thereby operates the switch 125 to shut down the machine. With the automatic assembly process of the machine completed, the core, coil and casing may now be removed from the machine as a complete unit. If desired, a top clamp 127 (FIG. 13) may be inserted between the top of the core 126 and the coil 17 before the unit is removed but it will be understood that the use of such a clamp is not necessary in all types of induction apparatus. To remove the unit from the machine, the jig 90 is moved upwardly by means of a plurality of rods 128 which are operated by a footpedal 129 (see FIGS. 1 and 4). The footpedal 129 is connected to the rods 128 through a suitable linkage generally indicated at 130 in FIG. 1. The rods 128 fit in channels in the support member 131 for the jig, and when footpedal 129 is depressed, these rods are moved upwardly so as to push the jig out of the aperture 88 to the top of the posts 85. This movement of the jig raises with it the assembled induction unit including the core, coil and casing, and when the jig is in its top most position, the assembled induction unit and the jig may be readily removed from the machine 1.

After the assembled unit and the jig 90 have been removed from the machine, the unit is then taken out of the jig. To do this, the ends of the spring clamp 92 are released from their engagement with the jig and with nothing more, no connection remains between the induction unit and jig. When the ends of the clamp 92 are released, it immediately tries to return to its normal position. As illustrated in FIG. 21, this causes the bowed center of the clamp to engage the end of the coil 17 and its outer upturned surfaces to engage the core 126. With this engagement of both the core and the coils, the clamp applies a force to the core pushing the lamination stack together. In other words it tends to maintain the layers of the core tightly together. It will thereby be seen that the clamp not only serves a useful function in supporting the center leg of the core during assembly, but also provides a desirable tightening action in the finished apparatus. After the unit is removed from the jig 90, a suitable cap may then be placed over the lower end of the casing to complete the assembly operation.

From the above it will be seen that I have provided a new and improved machine and method for automatically assembling a laminated core. In the illustrated embodiment, the position of the punchings is reversed in every other layer of the core. However, it will be readily understood that the machine can be adapted so as to reverse the position of the punchings only every second or every third layer rather than every other layer. This can be done merely by changing the size of slots in the punching gauges and the shape of the pusher or finger means which release the punchings from the magazines. Not only does my new and improved machine add the layers of punchings to the core automatically, it aligns every layer to insure that it will readily fit into the casing. Upon any failure in the supply of punchings, or upon any jamming in the core assembly area, the operation of the machine is automatically interrupted. Further, when the core has reached the desired size, the machine is automatically effective to stop the assembly operation. Also, in my preferred method of assembly, the same spring clamp which serves as a support for the stack during the assembly process later serves as a tightening means for the core in the finished apparatus.

Referring now to FIGS. 15–17, I have shown therein an alternate magazine arrangement which may be used in the machine 1 for releasing the I-shaped punchings. In the magazine 150 there illustrated, the I-shaped punching are supported by means of stationary shoulders 151 and 152 which project inwardly adjacent the bottom of the magazine. These stationary shoulders engage the under side of the bottom punching and thereby support the entire stack of punchings. It will be noted particularly that the shoulders or projections 151 and 152 project in from the end walls of the magazine instead of from the front and rear walls. Thus they engage the ends of the punchings rather than their sides.

To release the bottom punching or punchings from the magazine 150, there are provided slidable fingers or pushers 153 and 154. As shown these pushers ride in slots in the end walls of the magazine and they are actuated from a reciprocable operating member or link 155 by means of pins 156 and 157. Besides operating the pushers 153 and 154, the link 155 also actuates a cam 158 which fits into a recess 159 in its lower edge. The cam 158, as shown, controls a pivoted supporting member 160 adapted to move beneath the center portion of the bottom punching of the stack. When the member 160 is swung outwardly as indicated in FIG. 15, it provides a center support for the stack. But as shown in FIG. 16, it may also be turned inwardly by the cam 158 so as to allow the bottom punching to fall out of the stack.

To explain the sequence whereby the bottom punching or punchings are released from the magazine, I will refer first to FIG. 15. As shown in that figure, with the machine in its rest position, the bottom punching rests on the stationary shoulders 151, 152 and also upon the tab 160. To release the bottom punching, the link 155 is moved to the left (as viewed in FIGS. 10–12) by means of an actuating lever 161. As shown the lever 161 is connected to the link 155 by a pin and slot connection 162. The movement of the link 155 to the left carries with it the pushers or fingers 153 and 154, and this has the result that the bottom punching or punchings are pushed off the shoulder 152 and further on to the shoulder 151. In the illustrated embodiment, two punchings are being shown as released at once, but it will be understood that if desired only one punching can be pushed off at a time. Simultaneously, as the punchings are pushed off the shoulder 151, the tab 160 is retracted by the cam 158 so that the right hand end of the punchings may bend or flex downwardly.

After the punching has been pushed off the shoulder 152, the lever 161 then moves in the opposite direction so as to bring the link 155 back to the right (as viewed in FIGS. 15–17). This causes the pusher 153 to push the bottom punching or punchings off the shoulder 151 as shown in FIG. 17, and thereby they fall freely out of the magazine. By reason of the length of the slot 159 in the link 155, the cam 158 is not actuated to turn the tab 160 outwardly again until the punchings have been pushed completely off the shoulder 151. In other words, the punchings are allowed to fall out of the magazine 150 before the tab 160 comes out again to support the bottom punching of the stack. It will be understood of course, that as the pushers 151 and 152 move the bottom punchings off their respective shoulders, the flat surfaces 163 and 164 on the tops of the respective punchings themselves temporarily support the next to the bottom punchings in the stack.

It will be understood that magazines such as the magazine 150 may be substituted in the machine 1 for the magazines 25 and 27. This may be done since with either type of magazine, the bottom or bottom punchings are released at selected intervals. When used in the machine 1, the magazines 150 would, of course, be positioned over the tracks 73 in the same place as the magazines 25 and 27.

Referring now to FIGS. 22 and 23, I have shown therein an alternate movable finger or pushing means which may be used in the machine 1 for releasing the E-shaped punchings and the I-shaped punchings off the rear shoulders 30, 32, respectively. In FIG. 22, the alternate finger means are illustrated pushing an E punching. As hereinbefore explained, the E punching is released from the magazine by fingers or pushers which first push the bottom punching or punchings 18 rearwardly so that the ends of its legs clear the stationary projections at the front of the magazine. Simultaneously, the rear side of the crossbar is moved backwardly over the shoulder 30. As hereinbefore described, the rear wall of each of the E magazines is provided with slot 215 to permit the rearward movement of the bottom punching into this slot as it is carried rearwardly. To insure that only the desired number of E punchings at a time are moved from the magazine, the control member or gauge 210 is mounted in the rear wall of the E magazines, as hereinbefore described. After the front fingers or pushers have moved the punching far enough so that its legs clear the front projections, the fingers are then retracted forwardly until they themselves clear the crossbar of the punching. When a sufficient clearance has been obtained, the rear finger or pusher member 224 then moves forwardly. As shown, the finger 224 includes front surface 225 which butts against and thereby engages the edge portion 221 of the E punching. The finger 224 may be actuated by the same type of mechanism heretofore described and used in the operation of fingers 68; however, according to the instant embodiment, it is not necessary that the fingers be biased upwardly so as to hunt the punching to insure the engagement of the fingers with the edge portion 221; there is sufficient clearance between the edge portions 221 of the punching 18 being pushed and the bottom punching in the magazine (as shown in phantom) that the fingers 224 will positively engage and eject only the desired number of punchings. The fingers 224 may therefore be arranged to travel substantially horizontally without upward bias.

FIG. 23 illustrates the use of the pushers or fingers applied to an I-shaped punching. As hereinbefore described, according to one modification, first fingers or pushers first move the bottom I punching or punchings first off the front shoulder, then fingers 226, according to the instant embodiment, are adapted to be moved horizontally and to butt against and engage the edge portion 223 of the I punching 19 thereby pushing the punching off the rear shoulder 32 of each magazine, whereby the punching is dropped out of the magazine through the opening 35. The arm 37 actuating the finger 226 may be driven by means hereinbefore described. The rear wall of each I magazine is provided with a longitudinal slot 205 to permit relative movement of the bottom punching therein. A control member or gauge 200 is also provided in the rear wall of each of the I magazines to insure that only the selected number of punchings are ejected at a time. Since the front of the I punching drops off the front shoulder when it is moved rearwardly, sufficient angle exists between the edge portion of the bottom punching or punchings being ejected and the edge portion of the remainder of the punchings in the magazine that the finger 226 can butt against the edge portions 223 so that just the desired number of punchings will be ejected at one time; there is no need for the finger 226 to be biased toward the punching 19 as sufficient clearance exists between these edge portions 223 on the punchings being ejected and the bottom punchings in the magazine (as better seen in FIG. 22) so that only the correct number of punchings will be ejected each time.

FIGS. 24 and 25 illustrate another alternate finger or pushing means for ejecting punchings 227 whose recess 220 is in the form of a V-shaped notch having one edge portion 221 located inwardly toward the center of the punching from the rear edge or back side thereof. A finger or pusher member 230 has a front surface 231 adapted to butt against and engage the edge portion 229 of the punching 227. The finger 230 contains an offset or recessed portion 232 which provides sufficient clearance with the E punching 227 that when the rear edge of the punching 227 is pushed forward to clear the shoulder 30, the punching will drop from the magazine. In operation, with the finger 230 at its rearward position (most remote from the center of the machine), the punching 227 is pushed rearwardly so as to drop off the front projection of the magazine to the position shown in phantom in FIG. 25 with the front surface 231 of the finger 230 lining up with the edge portion 229 of recess 228. In this manner, the recess 228 drops over the front pushing surface 231 of the finger 230 and as finger 230 begins to move forward, it will butt against and engage the edge portion 229 of the notch 228. As the finger 230 is moved horizontally forward, it pushes the punching 227 off the rear shoulder 30 thereby permitting the punching 227 to drop free of the finger 230 and out of the magazine. The finger 230 may then be moved rearwardly (in a manner similar to that heretofore described) and into position to receive another punching. It is apparent from FIG. 25 that sufficient clearance exists between the punching which has been pushed from the front shoulder and the punchings remaining in the magazine so that the finger 230 will pick up and engage precisely the desired number of punchings; that is, there will be no interference between the punching or punchings being removed and the stack of punchings 227.

FIGS. 26 and 27 illustrate still another alternate arrangement for the movable finger means for pushing the laminations off the rear shoulder. Punchings are sometimes provided with apertures, for example, for through bolts or other purposes. Such apertures may be utilized for pushing the punchings off the rear shoulder. FIGS. 26 and 27 illustrate a punching 233 having an opening or aperture 234 therein; the aperture 234 necessarily has an edge portion 235 located toward the center of the punching from the rear edge or back side thereof. A finger or pushing member 236 is arranged to be translated horizontally through the reciprocation of lever 70, as hereinbefore described. During the translation of the finger 236, the bottom surface of the finger 236 slidably engages stationary track 240, having a front edge or stop 238. The finger 236 is capable of pivoting about pin 237 under the weight of the punching 233 after the pin 237 has moved beyond the stop 238. The finger 236 has a front surface 239 which, during the pushing of the punching 233, extends into the aperture 234 and butts against and engages the edge portion 235 thereof.

In operation, with the finger member 236 at its rearward position, the punching 233 is pushed off the front shoulder of the magazine, as hereinbefore explained; the front end of the punching 233 drops from the magazine, the rear edge of the punching remains on shoulder 30. The front surface 239 of the finger 236 is vertically aligned with the aperture 234 of the dropping punching so that, when the front end of the punching 233 drops, the front surface 239 of the finger 236 extends into the aperture 234. Forward movement of the finger 236 then pushes the punching 233 from the rear shoulder 30, due to the engagement of the front surface 239 with the edge portion 235. When the pivot 237 of the finger 236 moves forward of stop 238, the finger 236 is so balanced that the finger will pivot counterclockwise (as viewed in FIG. 27) about the pin 237; rearward travel of the finger 236 will withdraw the front surface 239 from the aperture 234 of the punching 233, permitting the punching 233 to fall clear of the magazine. Continued rearward movement of the finger 236 will cause the finger 236 to pivot clockwise as the pivot pin 237 approaches the stop 238 thereby returning the finger 236 to its rearward position ready to engage another punching.

While in accordance with the patent statutes, I have described what at present is considered to be the preferred embodiment of my invention, it will be obvious to those skilled in the art that various changes and modifications may be made therein without departing from the invention, and it is, therefore, intended in the appended claims to cover all such equivalent variations as fall within the true spirit and scope of the invention.

What I claim as new and desire to secure by Letters Patent of the United States is:

1. In an automatic machine for assembling laminated cores, a base, a magazine for a stack of core punchings mounted on said base, shoulder means projecting inwardly from opposite walls of said magazine for supporting said stack of punchings from the bottom, movable finger means for pushing the bottom punching of said stack first off the shoulder means of one of said walls and then off the shoulder means of the other of said walls, whereby said bottom punching is released from said magazine, and means for carrying said bottom punching after its release from said magazine into the core under assembly.

2. In an automatic machine for assembling laminated cores, a base, a magazine for a stack of core punchings mounted on said base, shoulder means projecting inwardly from opposite walls of said magazine for supporting said stack of punchings from the bottom, movable finger means for pushing the bottom punching of said stack first off the shoulder means of one of said walls and then off the shoulder means of the other of said walls, whereby said bottom punching is dropped out of said magazine, a track positioned below said magazine on said base for catching said bottom punching, and a reciprocable pusher movable in said track for sliding said bottom punching into the core under assembly.

3. In an automatic machine for assembling laminated cores, a base, a magazine for a stack of core punchings mounted on said base, shoulder means projecting inwardly from opposite walls of said magazine for supporting said stack of punchings from the bottom, movable finger means for pushing the bottom punching of said stack first off the shoulder means of one of said walls and then off the shoulder means of the other of said walls whereby said bottom punching is released from said magazine, means biasing said finger means into contact with said bottom punching to insure the proper engagement therebetween during the operation of said finger means, and means for moving said bottom punching after its release from said magazine into the core under assembly.

4. In an automatic machine for assembling laminated cores, a base, a magazine for a stack of core punchings mounted on said base, said punchings each having edge portions remote from the outside rear edge thereof, shoulder means projecting inwardly from opposite walls of said magazine for supporting said stack of punchings from the botom, first movable finger means for pushing the bottom punching of said stack first off the shoulder means of one of said walls, second finger means arranged to butt against and engage said edge portions to thereby push said bottom punching of said stack off the shoulder means of the other of said walls whereby said bottom punching is thereby released from said magazine, and means for moving said bottom punching after it is released from said magazine into the core under assembly.

5. In an automatic machine for assembling laminated cores, a base, a magazine for a stack of core punchings mounted on said base, shoulder means projecting inwardly from opposite walls of said magazine for supporting said stack of punchings from the bottom, movable finger means for pushing the bottom punching of said stack first off the shoulder means of one of said walls and then off the shoulder means of the other of said walls, whereby said bottom punching is dropped out of said magazine, means biasing said finger means into contact with said bottom punching to insure the proper engagement therebetween during the operation of said finger means, a track positioned below said magazine on said base for catching said bottom punching, and a reciprocable pusher movable in said track for sliding said bottom into the core under assembly.

6. In an automatic machine for assembling laminated cores, a base, a magazine for a stack of core punchings mounted on said base, an edge portion on each of said punchings remote from the outside rear edge thereof, shoulder means projecting inwardly from opposite walls of said magazine for supporting said stack of punchings from the bottom, first movable finger means for pushing the bottom punching of said stack off the shoulder means of one of said walls, second movable finger means arranged to butt against and engage said edge portion to thereby push said bottom punching off the shoulder means of the other of said walls, whereby said bottom punching is dropped out of said magazine, a track positioned below said magazine on said base for catching said bottom punching, and a reciprocable pusher movable in said track for sliding said bottom punching into the core under assembly.

7. In an automatic machine for assembling laminated cores, a base, a magazine for a stack of core punchings mounted on said base, shoulder means projecting inwardly from opposite walls of said magazine for supporting said stack of punchings from the bottom, movable finger means for pushing at least one punching at the bottom of said stack first off the shoulder means of one of said walls and then off the shoulder means of the other of said walls, thereby to release punchings intermittently from said magazine, a movable gauge disposed in said other wall for insuring that only a predetermined number of punchings can be released at a time by said finger means, and means for carrying said punchings after their release from said magazine into the core under assembly.

8. In an automatic machine for assembling laminated cores, a base, a magazine for a stack of core punchings mounted on said base, shoulder means projecting inwardly from opposite walls of said magazine for supporting said stack of punchings from the bottom, movable finger means for pushing at least one punching at the bottom of said stack first off the shoulder means of one of said walls and then off the shoulder means of the other of said walls, thereby to release punchings intermittently from said magazine, a movable gauge disposed in said other wall for insuring that only a predetermined number of punchings can be released at a time by said finger means, means biasing said finger means and said gauge into contact with the bottom punching of said stack, thereby to insure the proper relationship therebetween during the operation of said finger means, and means for carrying said punchings after their release from said magazine to the core under assembly.

9. The combination of claim 8 wherein said gauge is pivotally mounted and includes a narrow mouthed slot for controlling the movement of the punchings off said shoulder means.

10. In an automatic machine for assembling laminated cores, a base, a magazine for a stack of core punchings mounted on said base, each of said punchings have edge portions remote from the outside rear edge thereof, shoulder means projecting inwardly from opposite walls of said magazine for supporting said stack of punchings from the bottom, first movable finger means for pushing at least one punching at the bottom of said stack off the shoulder means of one of said walls, second movable finger means arranged to butt against and engage said edge portions for then pushing said punching off the shoulder means of the other of said walls, thereby to release ponchings intermittently from said magazine, a movable gauge disposed in said other wall for insuring that only a predetermined number of punchings can be released at a time by said finger means, means biasing said gauge into contact with a bottom punching of said stack, thereby to insure the proper relationship therebetween during the operation of said second finger means, and means for carrying said punchings after their release from said magazine to the core under assembly.

11. In an automatic machine for assembling laminated cores, a base, support means attached to said base for supporting the laminated core during assembly, a magazine for a stack of core punchings of one shape mounted on said base on one side of said support means, a magazine for a stack of core punchings of a different shape mounted on said base on the opposite side of said support means, each of said magazines having shoulder means projecting inwardly from the opposite walls thereof for supporting the associated stack of punchings from the bottom, movable finger means associated with each of said magazines for pushing the bottom punching of its stack first off the shoulder means of one of said walls and then off the shoulder means of the other of said walls, whereby said bottom punchings are released from said magazines, tracks positioned below said magazines for catching the punchings released from said magazines, and reciprocable pushers mounted in said tracks for sliding said punchings into the core from the opposite sides to form layers of said core.

12. In an automatic machine for assembling laminated cores, a base, a magazine for a stack of core punchings mounted on said base, said magazine including shoulder means protruding from opposite walls thereof for supporting said stack from the bottom, a movable pusher for pushing the bottom punching of said stack off one of said shoulder means, a second movable pusher for thereafter pushing said bottom punching off the other of said shoulder means, a pivoted tab, means moving said tab under said bottom punching as it is pushed off said one shoulder means, whereby said punching initially remains in said magazine, and thereafter withdrawing said tab as said punching is pushed off said second shoulder, whereby said punching falls downwardly out of said magazine, and means for carrying said punching into the core under assembly after it is released from said magazine.

13. In an automatic machine for assembling a laminated core in an outer casing, a base, supporting means for said casing mounted on said base, stacking means mounted on said base for inserting punchings into said casing to form said core, and control means responsive to any movement of said casing for stopping the assembly operation, said control means being mounted on said base and including a control switch for said stacking means and a movable actuating member for said control switch, said actuating member engaging said casing during the assembly operation and being operated by any movement of said casing, thereby to terminate the operation.

14. In an automatic machine for assembling a laminated core within an open ended outer casing having retainer means for engaging the top of said core to retain said core in position, a base, support means for said casing mounted on said base, at least one punching supply magazine mounted on said base, stacking means mounted on said base for withdrawing said punchings from said magazine and for inserting them into said casing through the open end thereof, thereby to form said core, said stacking means adding said punchings so that the core progressively lengthens in said casing during the assembly period, and control means responsive to the engagement of said core with said retainer means in said casing for stopping said machine, said control means including a movable actuator mounted on said base and engaging said casing for operation by any movement of said casing, and switch means operable by said actuator for terminating the operation of said stacking means.

15. In an automatic machine for assembling a laminated core, a base, support means on said base for supporting said core during the assembly thereof, a pair of magazines for holding a stack of E-shaped core punchings, said magazines being positioned on opposite sides of said support means, a pair of magazines for holding a stack of I-shaped punchings, said last mentioned magazines being positioned on opposite sides of said support means, all of said magazines being inclined from the vertical so that the stacks of punchings are held in an inclined relationship, each of said magazines including shoulder means projecting inwardly from opposite walls thereof for supporting the respective stack of punchings therein, movable finger means associated with each of said magazines for pushing the bottom punching of the stack first off the shoulder means of one of said walls and then off the shoulder means of the other of said walls, whereby said bottom punchings of said magazine are intermittently dropped out of said magazines, tracks positioned beneath said magazines on the opposite sides of said support means, a reciprocable pusher member associated with each of said tracks and movable therein for sliding said punchings together from the opposite sides of said support means to form said core, guide means for controlling the movement of said punchings as they are moved toward said core and effective to interrupt the assembly operation upon any failure in the supply of punchings, means including said support means for lifting said core upwardly after each layer of punchings is added far enough to allow the next layer to be added at the bottom, and clamping means for holding said core in the elevated position during the adding of said next layer.

16. In an automatic machine for assembling a laminated core, a base, at least one magazine mounted on said base for holding a stack of punchings, means for removing said punchings from said magazine and for inserting said punchings into the core at the bottom thereof, means for lifting said core upwardly after each layer of punchings is inserted far enough to allow the next layer to be added at the bottom, and clamping means for holding said core in the elevated position during the adding of the next layer.

17. In an automatic machine for assembling laminated cores, a base, a plurality of magazines mounted on said base for holding stacks of core punchings, shoulder means projecting inwardly from opposite walls of each of said magazines for supporting its stack of punchings from the bottom, movable finger means associated with each of said magazines for pushing the bottom punching off its stack first off the shoulder means of one of said walls and then off the shoulder means of the other of said walls, whereby the bottom punchings are released from said magazines, tracks positioned below said magazines on said base, pushers movable in said tracks for sliding said punchings into the core under assembly, means for aligning each new layer of punchings with the rest of said core after its insertion therein, lifting means for raising said core after each new layer of punchings is aligned to allow for the insertion of the next layer of punchings into said core, and clamping means for holding said core in its elevated position during the insertion of said next layer.

18. In an automatic machine for assembling laminated cores, a base, a magazine for a stack of core punchings mounted on said base, means for releasing said punchings from said magazine and for inserting said punchings into the core under assembly, movable guide means for controlling the movement of said punchings as they are moved toward said core, and switch means actuated by said guide means for interrupting the assembly operation upon any failure in the supply of punchings.

References Cited in the file of this patent
UNITED STATES PATENTS

| | | |
|---|---|---|
| 1,564,843 | Fulton | Dec. 8, 1925 |
| 1,966,878 | Bluzat | July 17, 1934 |
| 2,494,349 | Mittermaier | Jan. 10, 1950 |
| 2,572,312 | Burge | Oct. 23, 1951 |
| 2,671,951 | Sliwiak | Mar. 16, 1954 |
| 2,842,834 | Macchione | July 15, 1958 |
| 2,842,838 | Macchione | July 15, 1958 |
| 2,873,513 | Carlzen | Feb. 17, 1959 |